Oct. 18, 1927.

J. LEDWINKA 1,645,705

ELECTRIC SPOT WELDING APPARATUS

Filed May 4, 1923

WITNESS:—
Walter M. Trout.

INVENTOR.
JOSEPH LEDWINKA.
BY
C. B. Desjardins
ATTORNEY

Oct. 18, 1927. 1,645,705
J. LEDWINKA
ELECTRIC SPOT WELDING APPARATUS
Filed May 4, 1923 7 Sheets-Sheet 6

INVENTOR.
JOSEPH LEDWINKA

Patented Oct. 18, 1927.

1,645,705

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

ELECTRIC SPOT-WELDING APPARATUS.

Application filed May 4, 1923. Serial No. 636,563.

My invention relates to improvements in electric welding apparatus and has to do, more particularly, with apparatus for the practice of that type of electric resistance welding, known as "spot-welding".

One of the chief objects of my invention is to provide an improved electric spot-welder, which shall be portable and of such a nature that it may be used in a variety of different positions and locations so that the welding apparatus may be brought to the pieces to be united instead of bringing such pieces to the welding apparatus.

A further object of my invention is to provide an electric welding apparatus which shall be lighter and cost less to manufacture than electric spot-welding machines now on the market.

Another object of my invention is to provide an electric spot-welding apparatus which is suspended from or supported by the welding transformer and to provide for the automatic operation of apparatus of this type, so that the welding pressure is applied to the electrodes by suitable pressure means other than the operator.

A further object of my invention is to provide an electric spot-welding apparatus of the type supported by or suspended from the transformer, in which the welding pressure is applied to the electrodes and the welding circuit is closed automatically.

A further object of my invention is to provide apparatus for electric spot-welding in which the welding electrodes are carried by pivoted jaws which are caused to move simultaneously toward each other with a uniform movement, so as to apply welding pressure to the pieces to be united. Another object of my invention is to provide electric spot-welding apparatus, of the type supported by or suspended from the welding transformer, having a simultaneous control of the application of welding pressure and the closing of the welding circuit.

A further object of my invention is to provide electric welding apparatus, of the type supported by or suspended from a welding transformer in which those parts of the apparatus which are made of copper, or other metal of high conductivity, are provided with means protecting them from injury, due to the striking of such parts against harder objects in the use of the machine.

A further object of my invention is to provide electric welding apparatus of the type supported by or suspended from a welding transformer, of such construction that the use of copper, or equivalent metal of high conductivity, is restricted to those portions of the apparatus constituting the direct path of the welding current, so that the use of such more expensive metal is reduced to a minimum.

Another object of my invention is to provide electric spot-welding apparatus which is particularly efficient and durable, which can be produced at a low cost, as compared with other forms of spot-welding apparatus, and which has a very wide range of utility due to the fact that it may be used in many different positions and may be very quickly and conveniently brought to practically any position in which it is desired or necessary to make a spot-weld.

Further objects, and objects relating to details and economies of construction and operation, will definitely appear from the detailed description to follow. In one instance, I accomplish the objects of my invention by the devices and means described in the following specification. My invention is clearly defined and pointed out in the appended claims. A structure constituting a preferred embodiment of my invention is illustrated in the accompanying drawings, forming a part of this specification, in which:

In the drawings, the same reference numerals refer to the same parts throughout the several views and the sectional views are taken looking in the direction of the arrows at the ends of the section lines.

The utility of electric spot-welding apparatus at present on the market is greatly limited because of the fact that this apparatus is stationary and it is necessary to bring the pieces to be united to the welding apparatus so as to insert such pieces between the cooperating welding electrodes. Such apparatus is usually very large and bulky and consists of a frame which carries the welding transformer and has two separated arms, one carrying the stationary electrode and the other the movable electrode, such electrodes being connected to opposite sides of the secondary of the welding transformer. It is evident that, with such apparatus, only such pieces can be united as can be supported between the electrodes of the machine. There are many places in which it would be desirable to spot-weld two sheet-metal parts together, but in which it is impossible to support the parts between the electrodes of a stationary spot-welding apparatus such as I have referred to. For instance, in the manufacture of sheet-metal automobile bodies, the parts of the body are assembled in a jig and it is desirable to spot-weld many of these parts together but, in such practice, it is not possible to use such a stationary spot-welder because the parts of the automobile body, and the jig which holds them in assembled position, are so large and heavy that they cannot be conveniently supported between the welding electrodes of a stationary machine. It is the general purpose of my present invention to provide an apparatus for electric spot-welding which is portable and may be adjusted for use in a variety of different positions, so that the welding apparatus may be brought to the pieces to be united and adjusted to such position as to receive the pieces to be united between the welding electrodes of the machine. It is among the special purposes of my invention to provide improved spot-welding apparatus which is considerably reduced in weight and cost of manufacture, due to the elimination of the large and costly supporting framework heretofore employed. It is also among the special purposes of my invention to provide automatic means for applying welding pressure to the electrodes, so that it will not be necessary to rely upon the strength of the operator for the welding pressure. A further purpose of the invention is to provide means whereby a single movement of the hand of the operator will apply the welding pressure and automatically close the welding circuit when the electrodes engage the pieces to be united with the desired pressure.

I accomplish the purposes of my invention by providing a pair of pivotally-connected welding jaws supported by or suspended from the transformer. These welding jaws carry the welding electrodes and are insulated from each other, one of the jaws being connected to one lead from the transformer secondary and the other jaw being connected to the other lead, so that the welding current from the transformer must pass through the pieces to be united from one electrode to the other. I propose to support these welding jaws by means of an angularly adjustable connection with the secondary leads, so that they may be swung into any position desired, as may be most convenient for effecting a weld in the pieces to be united. In order to operate the welding jaws so as to bring the electrodes in contact with the pieces to be united with uniform pressure, I propose to provide a fluid pressure motor operating between such pivoted jaws and effective to swing them on their pivot so as to bring the electrodes into operative contact. I propose also to provide a toggle mechanism connected with such jaws and regulating and controlling the action of the fluid pressure motor so that it will impart equal swinging movement to each of the pivoted jaws. It is desirable that the welding current should not be closed until the full welding pressure has been brought to bear by the electrodes upon the work, and to accomplish that purpose, I propose to provide a switch which is automatically operated to close the welding circuit by the opening of the valve to admit fluid pressure to the fluid pressure motor for actuating the welding jaws. In order to prevent undue heating of the parts of the welding apparatus due to the passage of the welding current through them, it is desirable that those parts which form a part of the path of the welding current should be made of copper, or some equivalent metal of high conductivity, so as to offer comparatively little resistance to the passage of the welding current. Such copper parts, however, are comparatively soft and are quite easily damaged by striking against harder objects. Such damage is particularly likely to occur in a portable welder of this nature, which is designed to be moved by the operator from place to place so as to be brought into operative relationship with the pieces to be united. I propose to protect such copper parts from injury by using them as the cores or body portions of the welding jaws and surrounding those parts of such cores which are particularly likely to be struck and damaged, by protecting shells or strips of harder metal such as steel, which will not be likely to be injured. Thus I propose to provide steel welding jaws having copper cores carrying the copper electrodes and in direct electrical contact with copper pieces connected to the copper secondary leads of the transformer.

Figure 3:
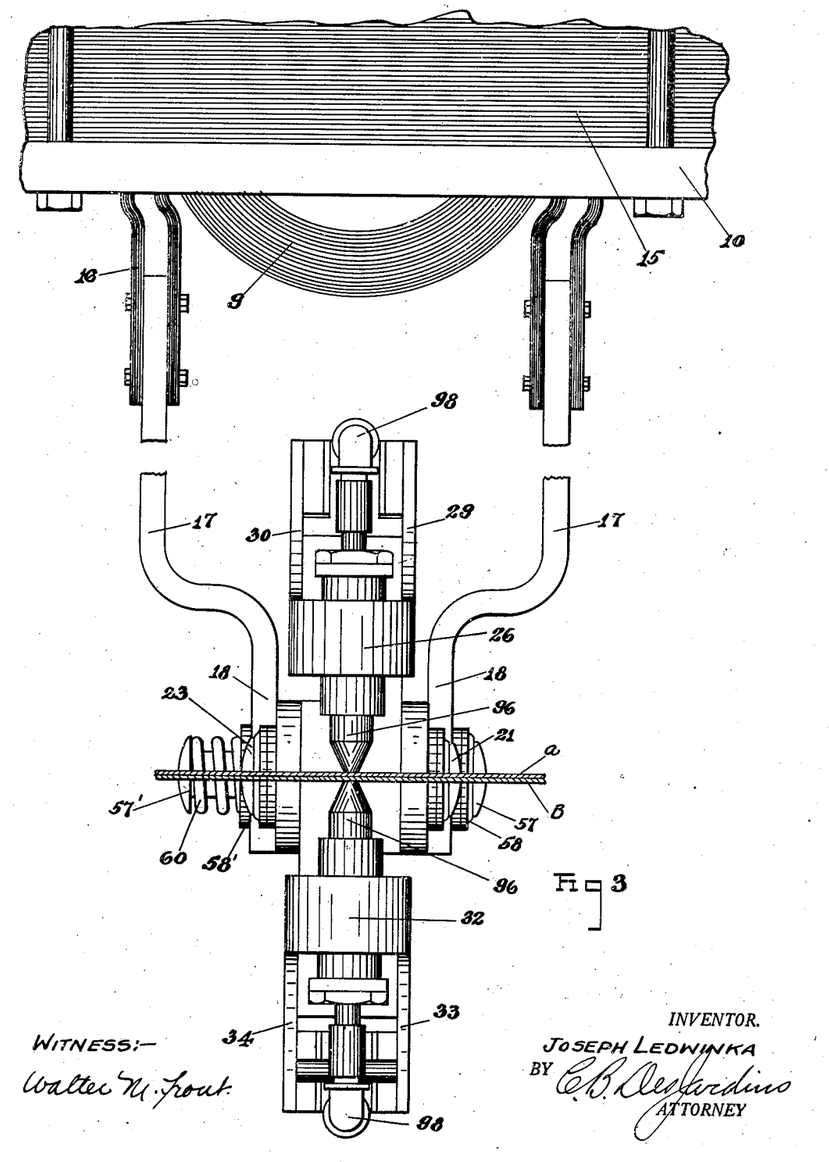
Fig. 3 is an enlarged, fragmentary view, looking in the direction indicated by the line 3—3 of Fig. 2, parts of the transformer and secondary leads therefrom being broken away.

The electric spot-welding apparatus which I have illustrated in the accompanying drawing constitutes an embodiment of my invention, which I have found to give very satisfactory results in actual use. The apparatus illustrated comprises a transformer, 10, which is supported in a cradle, 11, from a support, 14, by means of the eye-bolt, 13, and the cross-bar, 12. The transformer may be suspended thus from any desired overhead support and may, for instance, be raised and lowered and carried by an overhead conveyor to facilitate the shifting of the transformer, and the apparatus carried thereby from place to place. The connection between the eye-bolt, 13, and the crossbar, 12, is such as to permit the rotation of the transformer around the axis of the eye-bolt, so as to present the welding apparatus in any desired position. The transformer, 10, consists of the laminated core, 15, around which the primary and secondary of the transformer are wound in the usual manner, the primary winding being indicated at 9, see Fig. 3, and the secondary winding at 16. The copper strips or bars, 17, constituting the leads from the secondary, 16, are rigidly secured thereto and constitute the support for the remainder of the welding apparatus about to be described, the lower ends of said secondary leads being offset toward each other at 18, near the points where they are connected to the welding apparatus.

Figure 6:
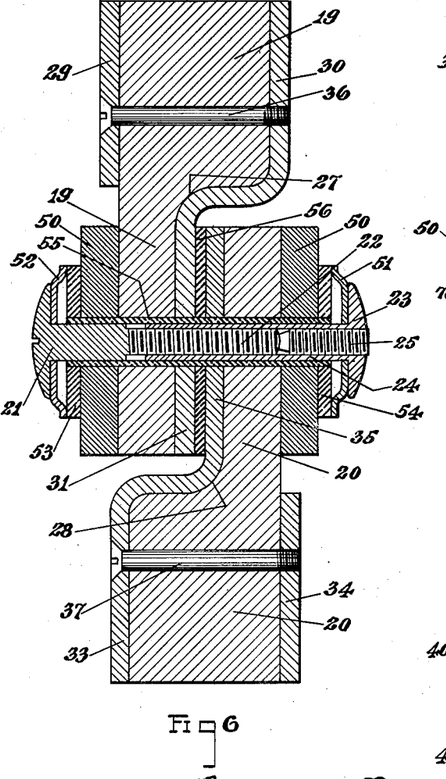
Fig. 6 is a detail, sectional view through the pivotal connection between the welding jaws, taken on the line 6—6 of Fig. 4.

The cooperating welding electrodes are carried by a pair of jaws pivotally connected together and supported by or suspended from the secondary leads, 17. These welding jaws comprise the copper cores, 19 and 20, which are mounted so as to swing on the common pivot pin, 21, as shown in Fig. 6. The male pivot pin, 21, has a reduced and externally-threaded shank, 22, which screws within the hollow shank, 24, of the female pivot pin, 23. When the male pin, 21, and the female pin, 23, are thus screwed together, they are locked in position by the locking pin, 25, as shown in Fig. 6. The copper cores, 19 and 20, are reduced in thickness so that they may overlap each other at the points where the pivot passes through them, thus forming the shoulders, 27 and 28. The copper cores, 19 and 20, are, in general, of bell-crank shape, having the pivot pin, 21, passing through one arm and the welding electrode carried at the end of the opposite arm. The copper core, 19, of the upper welding jaw is protected by a U-shaped protecting shell, 26, formed of sheet steel, having the side portions, 29 and 30, which extend parallel to each other. The U-shaped portion of the shell, 26, fits around that part of the copper core, 19, which carries the welding electrode, while the parallel side members, 29 and 30, extend rearwardly from the copper core and the mechanism for actuating the welding jaws is connected to the rear ends of such side members. The side member, 30, is bent inwardly, at 31, to conform to the shoulder, 27, of the core, 19, as shown in Fig. 6. The core, 20, of the lower welding jaw, is provided with a similar sheet steel protecting shell having a U-shaped portion, 32, the side portions, 33 and 34, extending rearwardly beyond the copper core, parallel to each other, and the portion, 35, which is offset to conform to the shoulder, 28, of the core, 20. The copper cores and the steel protecting shells are secured to each other by suitable means, such as the bolts, 36 and 37. Ears, 38 and 39, depend from the lower edges of the rear portions of the side members, 29 and 30, of the upper welding jaw and similar spaced ears, 40 and 41, extend upwardly from the upper edges of the rear portions of the side members, 33 and 34, of the lower welding jaw. These spaced ears provide means for connecting the toggle mechanism for regulating the movement of the welding jaws toward and from each other. The side members, 33 and 34, of the lower welding jaw, terminate in the spaced ears, 42 and 43, spaced apart by the spacing sleeve, 45, and the bolt, 44. The rear ends of the side members, 29 and 30, of the upper welding jaw, have similar spaced ears, 46 and 47, which are maintained in spaced relation by a similar sleeve and spacing bolt, 44'. The side members of the respective welding jaws may also be maintained in spaced relation at various points by similar sleeves and spacing bolts, as indicated at 48 and 49, (see Fig. 4).

The swinging welding jaws are mounted to swing on the common pivot, 21, carried by a pair of copper side bars, 50, which are adjustably connected to the lower ends of the secondary leads, 17, one of said bars being connected to each of the secondary leads, so that the bars are electrically connected to opposite sides of the secondary of the transformer. The pivot formed by the male and female pins, 21 and 23, passes through and is carried by the copper side bars, 50, as shown in Fig. 6, and also passes through the overlapping portions, 19 and 20, of the welding jaws. These side bars, 50, are applied to the outer sides of and make a good electrical contact with the respective core portions, 19 and 20, of the welding jaws and, since these bars are connected to opposite sides of the transformer secondary, it is necessary to insulate them from each other, and to insulate the welding jaws from each other and from the pivot, in order to prevent short-circuiting of the current at this point. I accomplish this by providing a fibre sleeve, 55, within which the pivot is disposed, said sleeve extending through the bars, 50, and the portions, 19, 31, 35 and 20 of the welding jaws, and insulating such portions from the pivot pin. A spring washer, 52, is provided between the head of the male pivot pin, 21, and the side bars, 50, and a corresponding spring washer, 51, is inserted between the head of the female pivot-pin, 23, and the other side bar, 50. Fibre insulating washers, 53 and 54, are inserted between such spring washers and the corresponding bars, 50, in order to insulate the bars from the heads of the pivot pin. A fibre insulating washer, 56, is mounted on the pivot and sleeve, 55, between the portions, 31 and 35, of the welding jaws, so as to insulate these welding jaws from each other. In this manner, the two welding jaws are completely insulated from each other, but each welding jaw is electrically connected to one of the side bars, 50, so that the welding current, coming from the secondary leads, passes through the side bars, 50, to the welding jaws and the electrodes carried thereby. This mounting of the welding jaws permits their pivotal movement with reference to each other, while the spring washers, 51 and 52, yieldingly press the parts toward each other so that there is a good electrical contact maintained between the side bars, 50, and those portions of the copper cores, 19 and 20, of the welding jaws which contact therewith.

Figure 9:
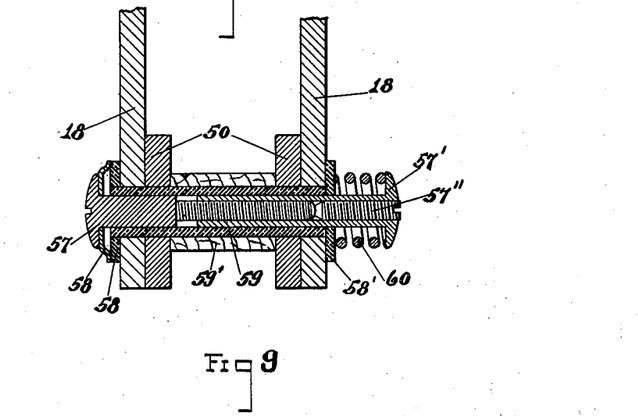
Fig. 9 is a detail, sectional view through the pivotal connection between the secondary leads and the side bars, taken on the line 9—9 of Fig. 4.

As stated above, the side bars, 50, are pivotally connected to the lower ends, 18, of the secondary leads, 17. This connection is effected by a pivot construction very similar to that previously described. This pivot construction is shown in Fig. 9 and comprises the male and female pivot-pins, 57 and 57', screwed one into the other and locked together by the lock-pin, 57''. The pivot thus formed is surrounded by a fibre insulating sleeve, 59, and the pivot and sleeve extend through both of the side bars, 50, and the secondary leads, 17. A spacing sleeve, 59', of insulating material, is mounted on the sleeve, 59, between the two side bars, 50, in order to keep them properly spaced with reference to each other. A spring washer, 58, and an insulating fibre washer, 58', are disposed between the head of the male pivot-pin, 57, and the adjacent secondary lead, 18, and, at the other end of the pivot, an insulating washer, 58', and a coil spring, 60, are positioned between the head of the female pivot pin, 57', and the adjacent secondary lead, 18. By means of this construction, the secondary leads and the side bars, 50, are pivotally and electrically connected together but, at the same time, the opposite side bars and secondary leads are thoroughly insulated from each other so that the welding current cannot short-circuit at this point. The spring washer, 58, and the coil spring, 60, put a resilient pressure on the parts tending to maintain the secondary leads in good electrical contact with the corresponding side bars, and, also, offering a frictional resistance which prevents unintentional or inadvertent pivotal movement of the side bars so that the welding apparatus tends to remain in the position to which it has been adjusted.

Figure 4:
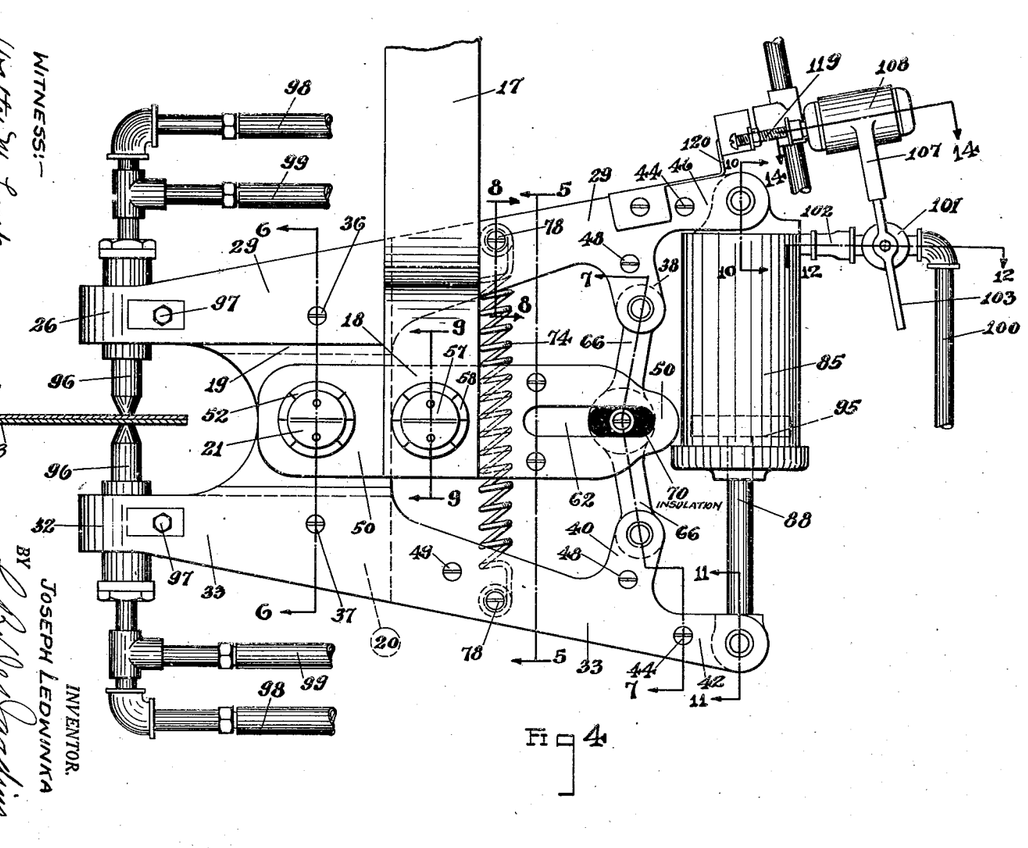
Fig. 4 is an enlarged view corresponding to the lower part of Fig. 2.
Figure 5:
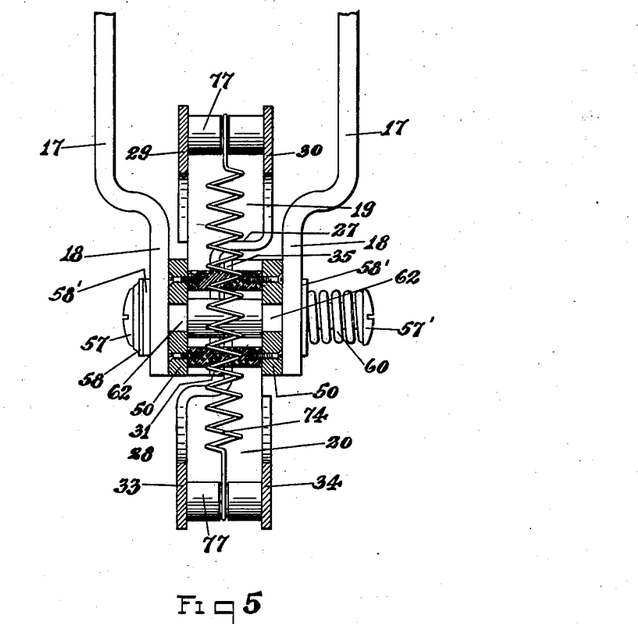
Fig. 5 is a detail, sectional view, taken on the line 5—5 of Fig. 4.
Figure 7:
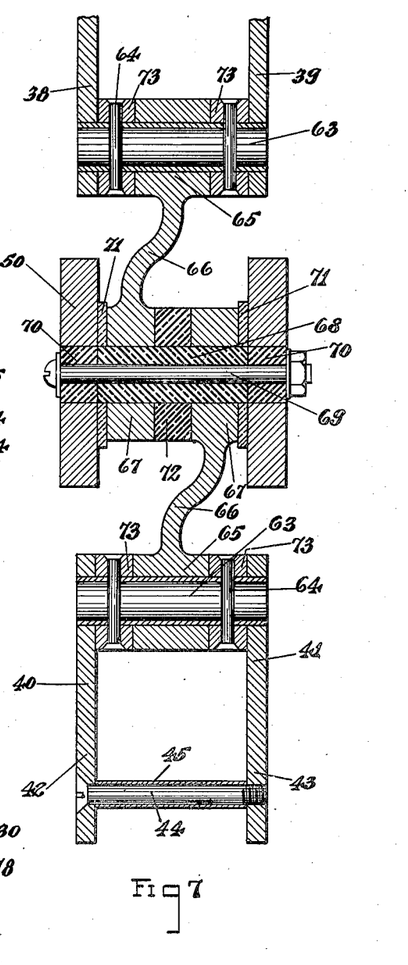
Fig. 7 is a detail, sectional view, taken on the line 7—7 of Fig. 4.
Figure 8:
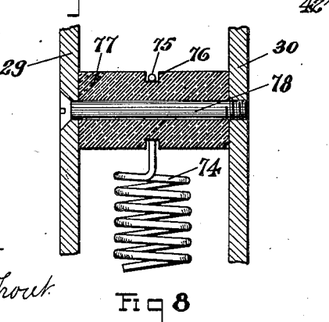
Fig. 8 is a detail, sectional view, taken on the line 8—8 of Fig. 4.

In order to equalize the swinging motion of the welding jaws in the operation of the apparatus, I provide a toggle mechanism connecting the rear ends of the welding jaws. In the rear portion of each of the side bars, 50, there is provided a slot, 62, as shown in Fig. 4. The pairs of ears, 38 and 39, on the rear portion of the upper welding jaw, are connected with the pair of ears, 40 and 41, on the lower welding jaw, by a pair of toggle links, 66, the inner ends of which are mounted on a common pivot pin, 69. This pivot-pin carries the guide blocks, 70, of fibre or other insulating material, which guide blocks move in the slots, 62, and, therefore, confine the axis of the pivot pin, 69, to movement in a plane containing the center lines of the two slots, thus equalizing the swinging movements of the welding jaws with reference to the side bars, 50. It is essential that these toggle links, 66, should be insulated from each other, and that the side bars, 50, should be insulated from each other at this point, in order to prevent short-circuiting of the welding current, and this is accomplished by the pivot construction connecting the links with each other. The toggle links, 66, are pivotally connected with the respective welding jaws by means of a hollow pivot, 63, passing through the spaced ears, 38 and 39, in the case of the upper jaw, or, 40 and 41, in the case of the lower jaw, and through the eye, 65, at the end of the toggle link. The toggle link is held spaced from the ears of the welding jaw by the collars, 73, mounted on the hollow pivot pin, 63, and secured thereto by the cross pins, 64, (see Fig. 7). A fibre insulating sleeve, 68, is mounted on the pin, 69, between the two guide blocks, 70, and the eyes, 67, at the inner ends of the toggle links, 66, are journaled on this insulating sleeve, said links being insulated from each other and from the side bars, 50, by the insulating fibre washers, 71, mounted on the sleeve, 68, between the links and the side bars, and the insulating fibre washer, 72, mounted on the sleeve, 68, between the two links.

The welding jaws are also connected by a spring, 74, having one end, 75, hooked over a fibre insulating block, 77, interposed between the side members, 29 and 30, of the upper welding jaw and secured in such position by the bolt, 78. The bent-over end, 75, of the spring may rest in a channel, 76, formed in such fibre block. The lower end of the spring, 74, is hooked around a similar block secured between the side members, 33 and 34, by a bolt, 78. This spring tends to swing the welding jaws on their pivot, in one direction, and yieldingly resists the swinging movement of such jaws, in the opposite direction.

Figure 10:
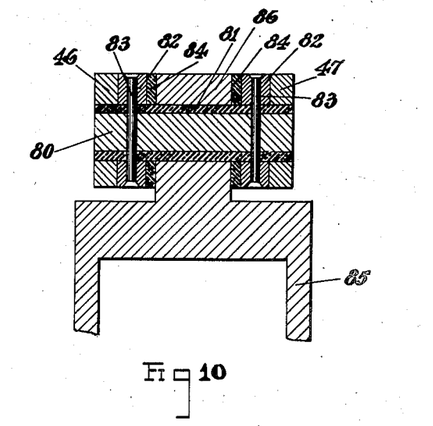
Fig. 10 is a detail, sectional view, taken on the line 10—10 of Fig. 4, and showing the connection between the fluid pressure cylinder and one of the welding jaws.
Figure 11:
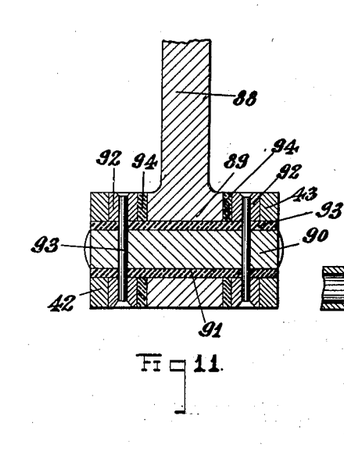
Fig. 11 is a detail, sectional view, taken on the line 11—11 of Fig. 4, and showing the connection between the piston rod of the fluid pressure motor and the corresponding welding jaw.
Figure 12:
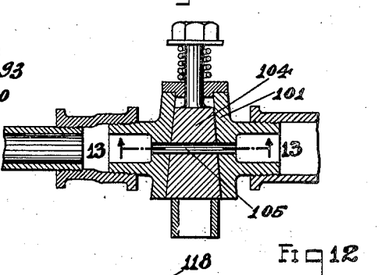
Fig. 12 is a detail, sectional view through the valve controlling the admission of fluid pressure to the cylinder, the view being taken on the line 12—12 of Fig. 4.
Figure 13:
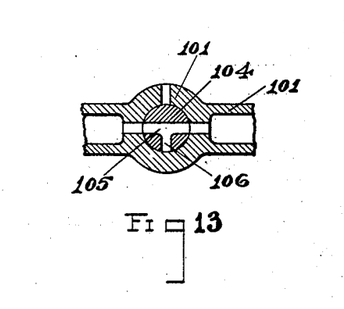
Fig. 13 is a detail, sectional view, taken on the line 13—13 of Fig. 12.

I provide a fluid pressure motor for operating the welding jaws to apply a welding pressure through the electrodes to the pieces to be united and such fluid pressure motor, in this embodiment, consists of a cylinder which is pivotally connected to the rear end of one of the welding jaws and in which a piston works having a piston rod pivotally connected with the other welding jaw, with the result that, when fluid pressure is admitted to said cylinder behind the piston, the rear portions of the welding jaws are moved away from each other, rocking the welding jaws on their pivot so as to cause the forward portions, which carry the electrodes, to approach each other. In order to prevent a short-circuiting of the welding circuit through this cylinder and piston, I provide means for insulating the cylinder from the welding jaw with which it is connected and also insulate the piston rod from the welding jaw to which it is connected. The connection between the cylinder and the upper welding jaw is illustrated in Fig. 10. The cylinder, 85, has an upstanding ear, 86, on its base, which ear is positioned between the spaced ears, 46 and 47, at the rear end of the upper welding jaw. A pivot consisting of the pin, 80, surrounded by the fibre insulating sleeve, 81, is carried by the ears 46 and 47, and passes through the ear, 86, on the base of the cylinder, 85. This pivot is fixed in position by the collars, 82, which are mounted thereon, between the ears, 46 and 47, and the ear, 86, of the cylinder base, said collars being held in position by the cross pins, 83. Insulating washers, 84, are mounted on the pivot between these collars and the ear, 86, so as to insulate the cylinder from the welding jaw. The ears, 42 and 43, at the rear end of the lower welding jaw, carry a similar pivot made up of the pin, 90, surrounded by the fibre insulating sleeve, 91, which pivot passes through the eye, 89, at the lower end of the piston rod, 88. The pivot is secured in position by the collars, 92, mounted on said pivot between the ears, 42 and 43, and the portion, 89, of the piston rod, and fastened to the pivot by the cross-pins, 93. Insulating fibre washers, 94, are mounted on the pivot sleeve, 91, between the portion, 89, of the piston rod, 88 and the collars, 92, so that the piston rod is completely insulated from the lower welding jaw and from the pivot pin, 90, (see Fig. 11). The piston rod, 88, carries the piston, 95, working in the cylinder, 85, as indicated by dotted lines in Fig. 4. The forward portions of the copper cores, 19 and 20, of the respective welding jaws, carry welding electrodes, 96, of the usual form, which are detachably held in position by electrode locks, 97, of any desired form, for instance, such as is shown in my Patent No. 1,326,601 of Dec. 30, 1919. These electrodes, 96, are provided with the usual cooling means to which the cooling fluid is brought by the pipes, 98, and from which it is discharged by the pipes, 99.

The fluid pressure is admitted to the cylinder, 85, from the pipe, 100, which is connected with the inlet tube, 102, by the three-way valve, 101. This three-way valve has a turning plug, 104, provided with the ports, 105 and 106, so arranged that, in one position, fluid flows from the pipe, 100, to the inlet pipe, 102, while, in another position, the fluid under pressure in the cylinder is permitted to escape through the valve to the atmosphere. The turning plug, 104, is controlled by a handle, 103, which has an extension, 107, carrying the switch casing, 108. Within the casing, 108, there is a chamber, 109, in which the two contacts, 110 and 111, are arranged, said contacts being spaced and insulated from each other and connected with the respective circuit wires, 112 and 113. A plunger, 115, is slidably mounted in the block of insulating material, 116, closing one end of the chamber, 109, and carries a contact plate, 114, within said chamber, which, when the plunger is depressed, engages both contacts, 110 and 111, thus closing the circuit between them. The plunger, 115, has a head, 118, outside the casing, and a spring 117, interposed between the block, 116, and said head, yieldingly forces the plunger out of the casing so as to carry the contact plate, 114, away from the contacts, 110 and 111. An adjustable stop, 119, is carried by the bracket, 120, mounted on the rear end of the upper welding jaw, (see Fig. 4), in such position that, when the handle, 103, is turned to fully open the valve so as to admit fluid pressure to the cylinder, 85, the head, 118, of plunger, 115, will have been engaged by said adjustable stop, 119, so as to depress the plunger and complete the circuit between the wires, 112 and 113.

Figure 1:
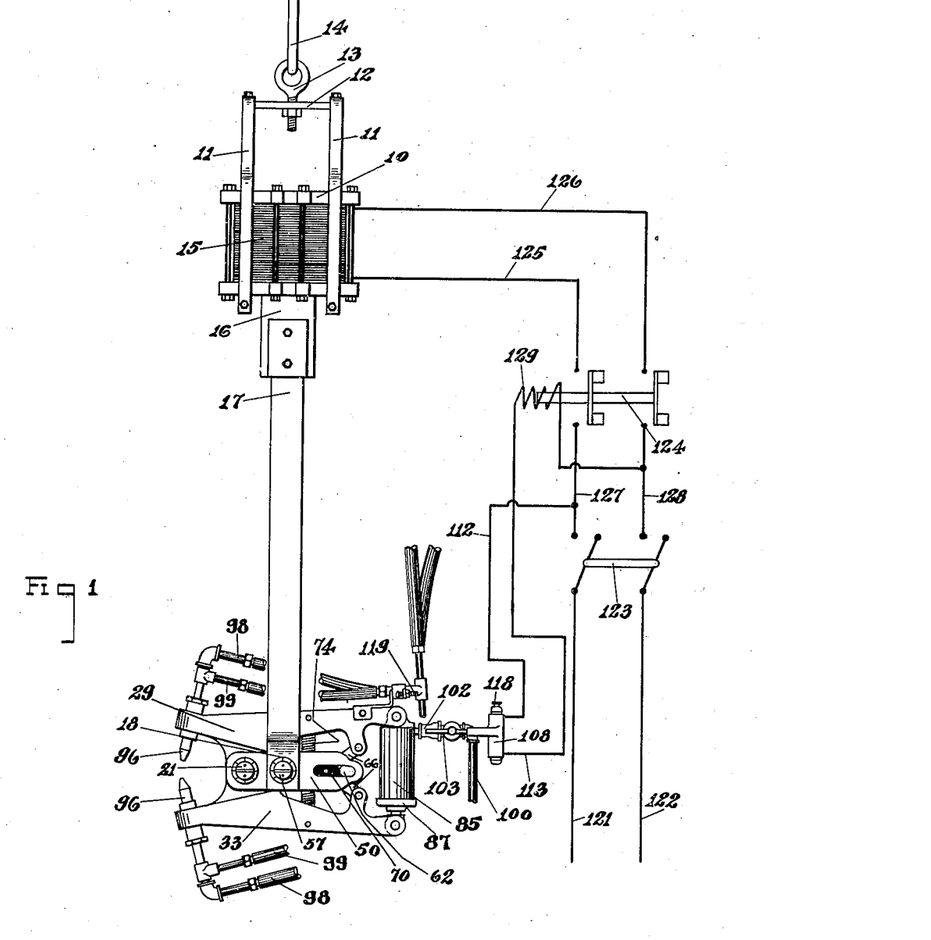
Fig. 1 is a view in side elevation of welding apparatus embodying my invention, the wiring for the switch controlling the welding circuit being illustrated diagrammatically.
Figure 14:
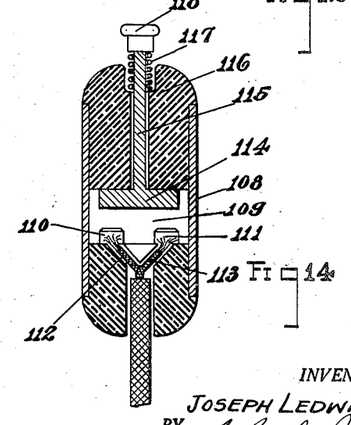
Fig. 14 is a detail, sectional view, taken on line 14—14 of Fig. 4, through the switch controlling the welding circuit.

The wiring for the switch controlling the welding circuit is illustrated diagrammatically in Fig. 1. The leads, 121 and 122, coming from any suitable source of electric current, are connected through line switch, 123, with the circuit leads, 127 and 128, which are connected through the electromagnetic switch, 124, with the leads, 125 and 126, connected to the primary winding of the transformer, 10. The wires, 112 and 113, shown in Fig. 14, form a shunt across the leads, 127 and 128, in which shunt the solenoid, 129, operating the electro-magnetic switch, 124, is included. When, the line switch, 123, being closed, the switch on the valve handle is operated, the shunt circuit is closed and the solenoid, 129, is energized, thus actuating the switch, 124, to a position closing the primary transformer circuit.

Figure 2:
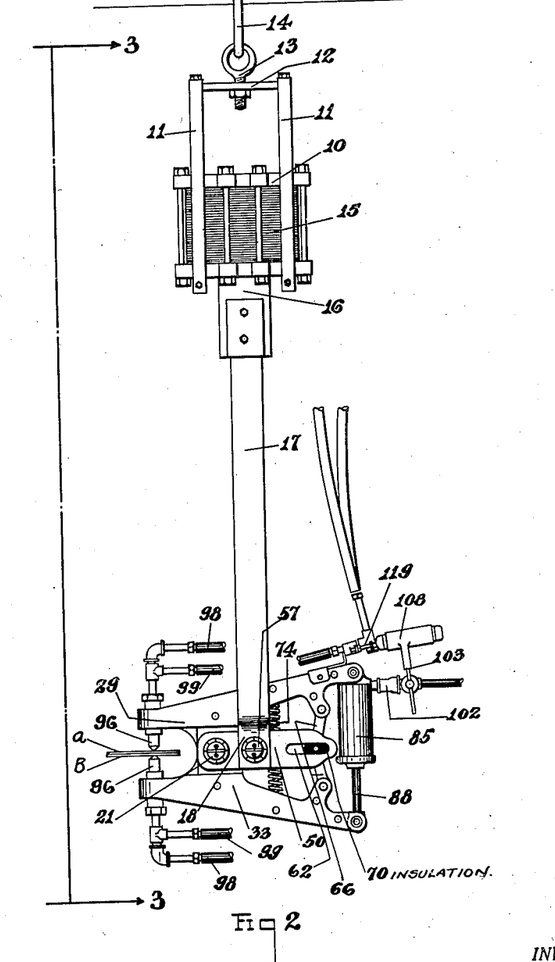
Fig. 2 is a corresponding view of the welding apparatus in side elevation, but showing the jaws closed upon the pieces to be united to apply the welding electrodes thereto under pressure.

The operation of this electric welding apparatus can be very readily understood from the foregoing description. In these drawings, two pieces of sheet metal to be united are indicated by the reference letters, A and B. In Fig. 1, the welding apparatus is shown with the welding jaws swung to positions in which the welding electrodes, 96, are separated from each other. When the two pieces of sheet metal to be united are positioned between the welding electrodes, 96, the operator grasps the switch casing, 108, and through it actuates the handle, 103, of the three-way valve, turning it to a position such as shown in Figs. 2 and 4, in which the valve is open and fluid pressure is admitted from the pipe, 100, through the valve, to the cylinder, 85. This fluid pressure forces the piston, 95, outwardly, thus separating the rear ends of the welding jaws against the tension of the spring, 74, and causing the electrodes, 96, to approach each other and to contact with the pieces of metal, A and B, to be united, with a pressure supplied by the fluid pressure motor, comprising the cylinder, 85 and the piston, 95, which pressure, however, is multiplied in proportion to the relative lengths of the lever arms of the welding jaw. Due to the guide-blocks, 70, sliding in the slots, 62, of the side bars, 50, the axis of the pivot of the toggle connecting the rear portions of the welding jaws is compelled to move in a plane which includes the center lines of the two slots, 62. This requires that the welding jaws shall always make equal angles with the side bars, 50, and equalizes the movement of the two electrodes, 96, due to the reaction of the fluid pressure motor, so that such pressure will not have a tendency to make the welding jaws swivel around the pivot, 21, when pressure is exerted upon them. As soon as the three-way valve has been fully opened to admit fluid pressure to the cylinder, 85, at which time the welding jaws have been rocked on their pivot so that the electrodes, 96, engage opposite faces of the pieces to be united at the requisite welding pressure, the head, 118, of the switch plunger, 115, engages the adjustable stop, 119, so that the plunger is depressed and the shunt circuit, 112 and 113, is closed, energizing the electro-magnetic switch so as to close the primary circuit. The welding current induced in the secondary circuit of the transformer passes through one of the secondary leads, 17, to that one of the side bars, 50, which is attached thereto, and, through said side bar, to the copper core of the welding jaw which is in electrical contact therewith, and, thence, through the electrode carried thereby and the pieces of metal to be united, to the cooperating electrode and, through the welding jaw which carries it and the corresponding side bar, to the other secondary lead and back to the transformer. The pieces of metal to be united are welded together by the combined action of the welding pressure exerted upon them and the welding heat generated by the resistance to the passage of the welding current between the electrodes through said pieces. When the welding current has passed for a sufficient length of time to complete the weld, the valve handle, 103, is turned to the position shown in Fig. 1, which action permits the plunger, 115, of the switch to rise, thus breaking the contact in the shunt circuit between the wires, 112 and 113, and deenergizing the solenoid, 129, so that the primary circuit is broken. The same action cuts off fluid pressure from the cylinder, 85, and permits the fluid under pressure in said cylinder to escape to the atmosphere, while the rear portions of the welding jaws are swung towards each other by the spring, 74, causing the electrodes, 96, to be separated so that the pieces to be united by the spot-weld may be removed.

It is to be noted that the welding jaws are suspended from the transformer and that there is no framework corresponding to the usual framework employed in stationary spot-welding machines, such as are on the market at the present time. The result is that this welding apparatus is very much lighter than the old form of apparatus and is not so expensive to manufacture, inasmuch as the large frame castings are eliminated. In fact, this welding apparatus is so light that it may be manipulated very conveniently by a single operator, so as to raise or lower or shift it from one position to another to bring the welding jaws, and the cooperating electrodes which they carry, into the proper positions with reference to the pieces to be united. The welding apparatus proper, that is, the pivoted welding jaws and their electrodes, is so compact and occupies so little space that it may be introduced very readily into places which, otherwise, would be inaccessible for spot-welding operations. The transformer, 10, and, consequently, the welding apparatus supported thereby may swivel around the axis of the eye-bolt, 13, so as to present the welding jaws at the proper angle to the work and the support, 14, to which the eye-bolt, 13, is secured, may, of course, be so mounted that it may be raised or lowered or shifted from one place to another. Such raising and lowering mechanism and the means for shifting the support, 14, form no part of my present invention and, hence, are not disclosed herein. The pivoted welding jaws are pivotally connected to the lower ends of the secondary leads, 17, as I have already pointed out, by the pivot made up of the male pivot-pin, 57, and the female pivot-pin, 57′, and the welding jaws may swivel in a vertical plane around the horizontal axis of this pivot. This permits of the angular adjustment of the welding apparatus and it is of particular advantage in situations where it is desired to weld together two pieces which do not lie in a horizontal plane. This is important since the electrodes, 96, should meet the pieces to be united at substantially right angles in order to get the best results. As already pointed out, the welding apparatus includes a pair of welding jaws which carry the cooperating electrodes and which are pivotally connected together by a pivot located to one side of the pivot connecting the welding apparatus to the lower ends of the secondary leads. The welding jaws, therefore, have their swinging movement around a different axis from the supporting axis of the welding apparatus. A portable electric welding apparatus of this character is frequently used in situations such that it is not possible or convenient for the operator to apply the necessary power to the welding jaws by hand to get the required welding pressure, inasmuch as this welding apparatus may often be used in situations which are so difficultly accessible that it would be a very awkward matter for the operator to operate the welding jaws manually to apply the welding pressure. I have overcome this difficulty by providing pressure means operating between the rear ends of the welding jaws and consisting of a reciprocating fluid pressure motor, the relatively moving parts of which are connected to opposite welding jaws so that, when the fluid pressure is admitted to the cylinder of the motor, the rear ends of the welding jaws are moved away from each other causing the forward ends of the welding jaws, which carry the electrodes, to approach each other. I have provided a valve for admitting fluid pressure to the cylinder and have arranged a switch which automatically closes the welding circuit, as soon as this fluid pressure valve has been fully opened, so that the welding electrodes engage the pieces to be united at full welding pressure. As a result, of this arrangement, all that the operator has to do after he has positioned the welding apparatus properly with respect to the pieces to be united, is to operate the fluid pressure valve. This can be very quickly and conveniently done, no matter in what awkward position the welding apparatus is being used. Portions of the welding apparatus constitute a part of the path of the welding current from the secondary leads, 17, to the electrodes, 96, and it is desirable that such parts be made of copper, or some other material of good electrical conductivity, so as to avoid excessive heating due to the resistance offered to the passage of the welding current. Thus, in the apparatus illustrated, the side bars, 50, and the cores, 19 and 20, of the welding jaws, are made of copper. These copper parts, however, are relatively soft and, if exposed, would be likely to be injured in use by striking against harder objects, for instance, when the operator is shifting the welding apparatus from one position to another, thus requiring frequent replacement and renewal of these expensive copper parts. The copper portions of the welding jaws are the parts most likely to be struck and injured in use and I have provided steel protecting shells, forming part of the welding jaws and arranged around the copper cores so as to protect them from injuries due to blows. These protecting shells, however, are not in the direct path of the current from the secondary leads, 17, through the side bars, 50, and the cores, 19 and 20, to the electrodes, 96, and, hence, do not offer any resistance to the passage of the welding current. This arrangement furthermore, permits me to economize in the construction of the welding jaws by reducing the amount of copper used in their construction, inasmuch as I provide the protecting shells with rearwardly extending portions forming the side members of the welding jaws to which various parts of the actuating mechanism are connected.

I am aware that the electric spot-welding apparatus illustrated in the accompanying drawings is susceptible of considerable change and variation without departing from the spirit of my invention and, therefore, I desire to claim my invention broadly, as indicated by the appended claims.

Having thus described my invention, what I claim as new and useful and desire to secure by Letters Patent of the United States is:

1. An apparatus of the class described comprising a welding transformer, a pair of secondary leads extending from said transformer, and welding mechanism supported by said leads and including a pair of side bars connected to the free ends of said leads and adapted to be adjusted to and maintained in angular relationship with respect thereto, and a pair of welding jaws pivotally connected together and to said side bars at a point located to one side of said connection between the secondary leads and side bars.

2. An apparatus of the class described comprising a transformer, a pair of secondary leads extending from said transformer, a pair of side bars supported by and pivotally connected to said leads, and a pair of welding jaws pivotally connected together and to said side bars.

3. An apparatus of the class described comprising a transformer, a pair of secondary leads extending therefrom, and welding mechanism supported by said secondary leads and including a pair of welding jaws pivotally connected together, one electrically connected with each of said secondary leads, pressure means acting between portions of said welding jaws to swing the same on their pivotal connection, and spring means acting on the welding jaws to yieldingly resist movement thereof by said pressure means.

4. An apparatus of the class described comprising a pair of side bars, a pair of welding jaws pivotally connected together and to the side bars, cooperating welding electrodes carried by said jaws, a source of welding current, said jaws being electrically connected to opposite sides of said source, pressure means acting on said welding jaws to swing the same, and means for equalizing the swinging movement of said welding jaws with respect to said side bars.

5. An apparatus of the class described comprising a pair of welding jaws pivotally connected together, welding electrodes carried by said jaws, a source of welding current, said jaws being electrically connected to opposite sides of said source, pressure means acting between portions of said jaws to swing the same, and an equalizing linkage connecting said welding jaws.

6. Apparatus of the class described comprising a pair of relatively movable welding jaws connected together, welding electrodes carried by said jaws, a source of welding current, said jaws being electrically connected to opposite sides of said source, means for imparting relative movement to said jaws, and a relative motion equalizing means connecting said welding jaws.

7. An apparatus of the class described comprising a pair of side bars, a pair of welding jaws pivotally connected together and to said side bars, cooperating welding electrodes carried by said jaws, a source of welding current, said welding jaws being electrically connected to opposite sides of said source, pressure means acting between portions of said jaws to swing the same, and an equalizing linkage connecting said welding jaws, the joint of said linkage being constrained to move in a straight line with reference to said side bars.

8. An apparatus of the class described comprising a pair of side jaws, a pair of welding bars pivotally connected together and to said side bars, cooperating welding electrodes carried by said jaws, a source of welding current, said welding jaws being electrically connected to opposite sides of said source, pressure means acting between portions of said jaws to swing the same, and an equalizing linkage connecting said welding jaws, one of said side bars having a slot therein and said linkage including a central joint having a guide-block working in said slot.

9. An apparatus of the class described comprising a pair of welding jaws mounted to swing on a common pivot, a source of welding current, said welding jaws being insulated from each other and electrically connected to opposite sides of said source, means for actuating said welding jaws, and an equalizing linkage connecting said welding jaws and including a pair of links pivotally connected together and insulated from each other.

10. An apparatus of the class described comprising a pair of side bars, a pivot carried thereby, a pair of welding jaws mounted to swing on said pivot, a source of welding current, said welding jaws being electrically connected to opposite sides of said source and being insulated from each other, means for actuating said welding jaws, and equalizing linkage connecting said welding jaws and including links pivotally connected to the welding jaws and joined together by an insulating pivot, said links being insulated from each other and from the side bars.

11. An apparatus of the class described comprising a pair of side bars having slots therein, a pivot carried by said side bars, a pair of welding jaws mounted to swing on said pivot, a source of welding current, said welding jaws being insulated from each other and electrically connected to opposite sides of said source, means for actuating said welding jaws, and an equalizing linkage including links pivotally connected to said jaws and joined together by a pivot, and guide-blocks of insulating material carried by said pivot and working in the slots of said side bars, said links being insulated from each other and from the side bars.

12. An apparatus of the class described comprising a transformer, a pair of spaced secondary leads extending therefrom, a pair of spaced side bars, one of said side bars being in electrical contact with each of said secondary leads, a pivot passing through said leads and side bars and pivotally connecting the same together, insulating means between said pivot and the leads and side bars, a spacing and insulating member mounted on the pivot between the side bars, spring means on said pivot acting to hold each side bar in contact with the corresponding lead, and a pair of pivoted welding jaws carried by said side bars, said jaws being insulated from each other and electrically connected to the respective side bars.

13. An apparatus of the class described comprising a transformer, a pair of secondary leads extending therefrom, a pair of spaced side bars arranged one in electrical contact with each of the secondary leads, a pivotal connection between said secondary leads and side bars including male and female pivot pins extending therethrough and screwed one into the other, a lock pin screwed into the female pivot pin and engaging the male pivot pin, an insulating sleeve around said pivot, a spacing and insulating sleeve mounted on said pivot between the side bars, insulating washers mounted on said pivot and engaging the outer sides of the secondary leads, and spring means interposed between the heads of said pivot pins and said washers, and a pair of welding jaws pivotally carried by said side bars.

14. In an apparatus of the class described the combination of a pair of welding jaws and a pivot connecting said welding jaws comprising a male pivot pin having a reduced and threaded shank, a female pivot pin having a hollow internally-threaded shank into which the threaded shank of the male pivot pin is screwed, and a locking pin screwed into the hollow shank of the female pivot pin and engaging the end of the male pivot pin to lock the two parts together.

15. An apparatus of the class described comprising a transformer, a pair of secondary leads extending therefrom, side bars connected to said leads, a pair of welding jaws mounted to swing on a common pivot carried at one end of said side bars, and connections between the opposite ends of said side bars and the welding jaws.

16. An apparatus of the class described comprising a transformer, a pair of secondary leads extending therefrom, a pair of side bars, one carried by and electrically connected with each secondary lead, a pair of welding jaws mounted to swing on a common pivot carried by said side bars at one end thereof, and connections between the opposite ends of said side bars and the welding jaws for equalizing the angular movements of said welding jaws with respect to said side bars.

17. An apparatus of the class described comprising a transformer, a pair of secondary leads extending therefrom, a pair of side bars, one connected with each secondary lead, a pair of welding jaws mounted to swing on a common pivot carried by said side bars at one end thereof, means for actuating said welding jaws, and an equalizing linkage connecting said welding jaws and including a pivot joint constrained to straight line movement with respect to said side bars.

18. An apparatus of the class described comprising a transformer, a pair of secondary leads extending therefrom, a pair of side bars, one connected with each secondary lead and each provided with a slot, a pair of welding jaws mounted to swing on a common pivot carried by said side bars at one end thereof, means for actuating said welding jaws, an equalizing linkage connecting said welding jaws and including a pair of links connected by a pivot pin, and guide-blocks carried by said pivot pin and working in the slots of said side bars.

19. An apparatus of the class described comprising a source of welding current, a pair of swinging welding jaws pivotally connected together and connected to opposite sides of said source, each welding jaw comprising a core of relatively high conductivity and a protecting metal shell of lower conductivity, and welding electrodes carried by the cores of said welding jaws.

20. An apparatus of the class described comprising a source of welding current, a pair of swinging welding jaws pivotally connected together and connected to opposite sides of said source, each welding jaw comprising a core of relatively high conductivity and a protecting metal shell of lower conductivity including a U-shaped member fitting over said core, and welding electrodes carried by the cores of said welding jaws.

21. An apparatus of the class described comprising a source of welding current, a pair of swinging welding jaws pivotally connected together and electrically connected to opposite sides of said source, each welding jaw comprising a core of relatively high conductivity and a metal shell of lower conductivity including a U-shaped portion surrounding the core and spaced side members extending rearwardly from said core, and electrodes carried by the cores of said welding jaws.

22. An apparatus of the class described comprising a source of welding current, a pair of swinging welding jaws pivotally connected together and electrically connected to opposite sides of said source, each of said welding jaws including a crank-shaped core of relatively high conductivity and a protecting shell of lower conductivity embracing said core, one arm of each of said cores mounted on a common pivot, and a welding electrode carried by the other arm of each core.

23. An apparatus of the class described comprising a transformer, a pair of copper secondary leads extending therefrom, a pair of copper side bars carried by said leads, one making electrical contact with each of said secondary leads, a pair of swinging welding jaws pivotally connected together, each welding jaw including a copper core making electrical contact with one of said side bars, and welding electrodes carried by the cores of said welding jaws.

24. An apparatus of the class described comprising a source of welding current, a pair of swinging welding jaws pivotally connected together and electrically connected to opposite sides of said source, each welding jaw including a core of relatively high conductivity and a metal protecting shell of lower conductivity, electrodes carried by the cores of said welding jaws, and pressure means for actuating said welding jaws connected to said protecting shells.

25. An apparatus of the class described comprising a source of welding current, a pair of swinging welding jaws pivotally connected together and electrically connected to opposite side of said source, motor mechanism for actuating said jaws, an operating handle controlling said motor mechanism, a circuit closing switch carried by said handle and adapted to control the welding current, and a stop positioned to engage and actuate said switch when the handle is moved to one position.

26. An apparatus of the class described comprising a transformer, a pair of rigid secondary leads extending therefrom, a pair of side bars, one carried by each of said leads and adapted to be adjusted to and maintained in angular relationship with respect thereto, a pivot carried by said side bars, a pair of welding jaws mounted to swing on said pivot, the body portions of said jaws lying on opposite sides of the pivot, cooperating welding electrodes carried by said jaws at one end thereof, and pressure means for actuating said jaws connected to the ends thereof opposite said electrodes.

27. An apparatus of the class described comprising a transformer, a pair of rigid secondary leads extending therefrom, a pair of side bars, one carried by each of said leads and adapted to be adjusted to and maintained in angular relationship with respect thereto, a pivot carried by said side bars, a pair of welding jaws mounted to swing on said pivot, the body portions of said jaws lying on opposite sides of said pivot, cooperating welding electrodes carried by the jaws at one end thereof, and a reciprocating fluid pressure motor for actuating said jaws connected to the ends thereof opposite said electrodes.

28. An apparatus of the class described comprising a transformer, a pair of secondary leads extending therefrom, a pair of side bars, one carried by each of said leads, a pivot carried by said side bars, a pair of welding jaws mounted to swing on said pivot, the body portions of said jaws lying on opposite sides of said pivot, cooperating welding electrodes carried by said jaws at one end thereof, pressure means for actuating said jaws connected to the ends thereof opposite said electrodes, and a toggle linkage connected to the same ends of said jaws, the joint of said toggle being confined to a straight line motion with respect to said side bars.

29. An apparatus of the class described comprising a transformer, a pair of secondary leads extending therefrom, a pair of side bars, one carried by each of said leads, a pivot carried by said side bars, a pair of welding jaws mounted to swing on said pivot, the body portions of said jaws lying on opposite sides of said pivot, cooperating welding electrodes carried by said jaws at one end thereof, pressure means for actuating said jaws connected to the opposite ends thereof from said electrodes, a toggle linkage for equalizing the movement of said jaws with reference to the side bars connected to the last-mentioned ends of said jaws, and a spring also connecting said last-mentioned ends of the jaws.

30. An apparatus of the class described comprising a transformer, a pair of secondary leads extending therefrom, a pair of side bars, one pivotally connected to each of said leads at an intermediate portion of the side bar, a pivot carried by the forward end of said side bars, and a pair of swinging welding jaws mounted on said pivot.

31. An apparatus of the class described comprising a transformer, a pair of secondary leads extending therefrom, a pair of side bars, one pivotally connected to each secondary lead at an intermediate portion of the side bar, a pivot carried by the forward ends of said side bars, a pair of welding jaws mounted to swing on said pivot, a fluid pressure motor for actuating said jaws, and a linkage connecting said jaws and the rear ends of said side bars and adapted to equalize the swinging movements of said jaws with reference to the side bars.

32. An apparatus of the class described, an overhead mounted welding transformer, rigid secondary bus-bars suspended from said transformer, welding jaws swingably mounted at the lower ends of said rigid bus-bars, and a motor carried by said jaws to swing the same relative to each other.

33. An apparatus of the class described, an overhead-mounted welding transformer, secondary leads depending from the secondary terminals of said transformer, welding jaws swingably mounted at the lower ends of said leads, a motor carried by the jaws to swing the same relative to each other, and a common means supported adjacent said jaws for simultaneously controlling the motor and the application of power to the welding circuit.

34. In an apparatus of the class described, a fixed support, a pair of welding jaws pivotally connected together, means for adjustably mounting said jaws upon said support independently of said pivotal connection, and means for maintaining said pair of jaws in adjusted position relative to said support.

35. An apparatus of the class described comprising an overhead welding transformer, rigid secondary bus-bars depending at a considerable distance below said transformer, relatively movable welding electrodes and a motor for producing such relative movement connected therewith and both supported from the lower end of said bus-bars, and means independent of the motor for angularly adjusting the welding electrodes with respect to the said rigid bus-bars.

In testimony whereof, I affix my signature.

JOSEPH LEDWINKA.